United States Patent [19]
Ho

[11] Patent Number: 5,984,784
[45] Date of Patent: Nov. 16, 1999

[54] GAME APPARATUS WITH FAST-ACCESS KEYS

[75] Inventor: Heng-Chun Ho, Taipei, Taiwan

[73] Assignee: Primax Electronics Ltd., Taipei Hsien, Taiwan

[21] Appl. No.: 08/926,977

[22] Filed: Sep. 10, 1997

[30] Foreign Application Priority Data

Jul. 8, 1997 [TW] Taiwan ................................ 86211266

[51] Int. Cl.$^6$ ........................................................ A63F 9/24
[52] U.S. Cl. ................................ 463/29; 463/36; 345/151
[58] Field of Search ................................ 463/36, 37, 38, 463/29; 345/326, 333, 156, 161, 168, 172

[56] References Cited

U.S. PATENT DOCUMENTS

| | | | |
|---|---|---|---|
| 5,333,273 | 7/1994 | Raasch et al. | 710/67 |
| 5,613,135 | 3/1997 | Sakai et al. | 710/62 |
| 5,790,120 | 8/1998 | Lozares et al. | 345/349 |

*Primary Examiner*—Valencia Martin-Wallace
*Attorney, Agent, or Firm*—Rabin & Champagne, P.C.

[57] ABSTRACT

A game apparatus with fast-access keys that can help the player to gain instant access to selected games is provided. The provision of the fast-access keys allows more friendliness and popularity to the game apparatus. The game apparatus includes a storage unit containing a plurality of game programs; a triggering device associated with a number of fast-access keys; and a control device coupled between the triggering device and the storage unit. Each key and key combination of the fast-access keys on the triggering device corresponds to a certain one of the game programs stored in the storage unit. The pressing of each key and key combination can cause the generation of a corresponding trigger signal which is transferred to the control device. In response to the trigger signal, the control device generates and transfers a start signal to the storage unit so as to retrieve a corresponding game program from the storage unit. This allows the selected game program to be loaded into the main memory of the game apparatus and run instantly for the player to play with.

10 Claims, 3 Drawing Sheets

GAME APPARATUS WITH FAST-ACCESS KEYS

BACKGROUND OF THE INVENTION

1. Field of the Invention

This invention relates to game apparatuses, and more particularly, to a game apparatus with a set of fast-access keys which can help the player to gain instant access to selected games that are available for running on the game apparatus.

2. Description of Related Art

Playing video games on game apparatuses, such those from NINTENDO or SEGA, is now a widely popular pastime for all ages of people. Typically, the game apparatuses come with a cassette which contains a number of games that can be selected for play by the player. One drawback to these game apparatuses, however, is that, in order to run a certain game from the cassette, the player needs to go through a wearisome and time-consuming sequence of steps that ask the player to specify certain settings or options. Moreover, the instructions on the screen for these settings or options may be written in any of various languages, typically Japanese or English, unless the game apparatuses have been specifically localized. To those people who are illiterate or unable to read English, they may not easily get into play with the game apparatus. The necessity to specify certain settings or options is therefore usually a frustration to many people who are otherwise interested in playing the video games.

SUMMARY OF THE INVENTION

It is therefore a primary objective of the present invention to provide a game apparatus with fast-access keys which can help the player to gain instant access to selected games provided by the game apparatus without having to specify certain settings or options in advance.

It is another objective of the present invention to provide a game apparatus with fast-access keys which allows the player not to be involved in reading step-by-step instructions before getting into play with the game apparatus.

In accordance with the foregoing and other objectives of the present invention, a game apparatus with fast-access keys is provided.

In accordance with a first preferred embodiment, the game apparatus of the invention includes the following constituent parts:

(a) a main unit containing a plurality of game programs;

(b) a separate keypad coupled to the main unit, said keypad including a number of fast-access keys, each key and key combination corresponding to a certain one of the game programs on the main unit; and (c) game control means coupled to the main unit, which is used for action control of a selected game running on the game apparatus.

Moreover, said main unit includes a fast-access control program which specify the corresponding relationship between said fast-access keys and the game programs, and which is capable of starting the selected game program in response to the corresponding input from the fast-access keys.

In accordance with a second preferred embodiment, the game apparatus of the invention includes the following constituent parts:

(a) a main unit containing a plurality of game programs;

(b) a game controller coupled to the main unit, said game controller including:

(i) a fast-access keypad having a number of fast-access keys, each key and key combination corresponding to a certain one of the game programs on the main unit; and (ii) a control panel having a number of control keys used for action control of a selected game running on the game apparatus.

Fundamentally, the game apparatus of the invention includes the following constituent circuit elements:

(a) a storage unit containing a plurality of game programs;

(b) a triggering device associated with a number of fast-access keys, each key and key combination corresponding to a certain one of the game programs stored in the storage unit, the pressing of each key and key combination causing the generation of a corresponding trigger signal; and (c) a control device coupled between the triggering device and the storage unit, which is capable of generating a start signal in response to the received trigger signal from the triggering device, the start signal being able to load and start a corresponding game program stored in the storage unit.

Moreover, the invention can be utilized on a personal computer (PC) for the user to gain instant access to the game programs running on the PC. In accordance with this concept, the game apparatus implemented on a PC includes:

(a) a main unit containing a plurality of game programs;

(b) a keyboard coupled to the main unit, the keyboard having a plurality of keys; and (c) means for simulating a selected number of keys on the keyboard as a number of fast-access keys, each key and key combination corresponding to a certain one of the game programs on the main unit.

In the foregoing game apparatus, said simulating means includes a fast-access control program which specify the corresponding relationship between said fast-access keys and the game programs, and which is capable of starting the selected game program in response to the corresponding input from the fast-access keys.

In conclusion, the invention can be utilized on conventional game apparatuses to provide fast-access keys that can help players to gain instant access to selected programs, which is more friendly to and popularity with the players. Moreover, the invention can be utilized on personal computers to provide a fast-access program that use certain keys on the standard PC keyboard to simulate the above-mentioned fast-access keys that can help PC users to gain instant access to selected programs on the PC.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

First Preferred Embodiment

Figure 1:
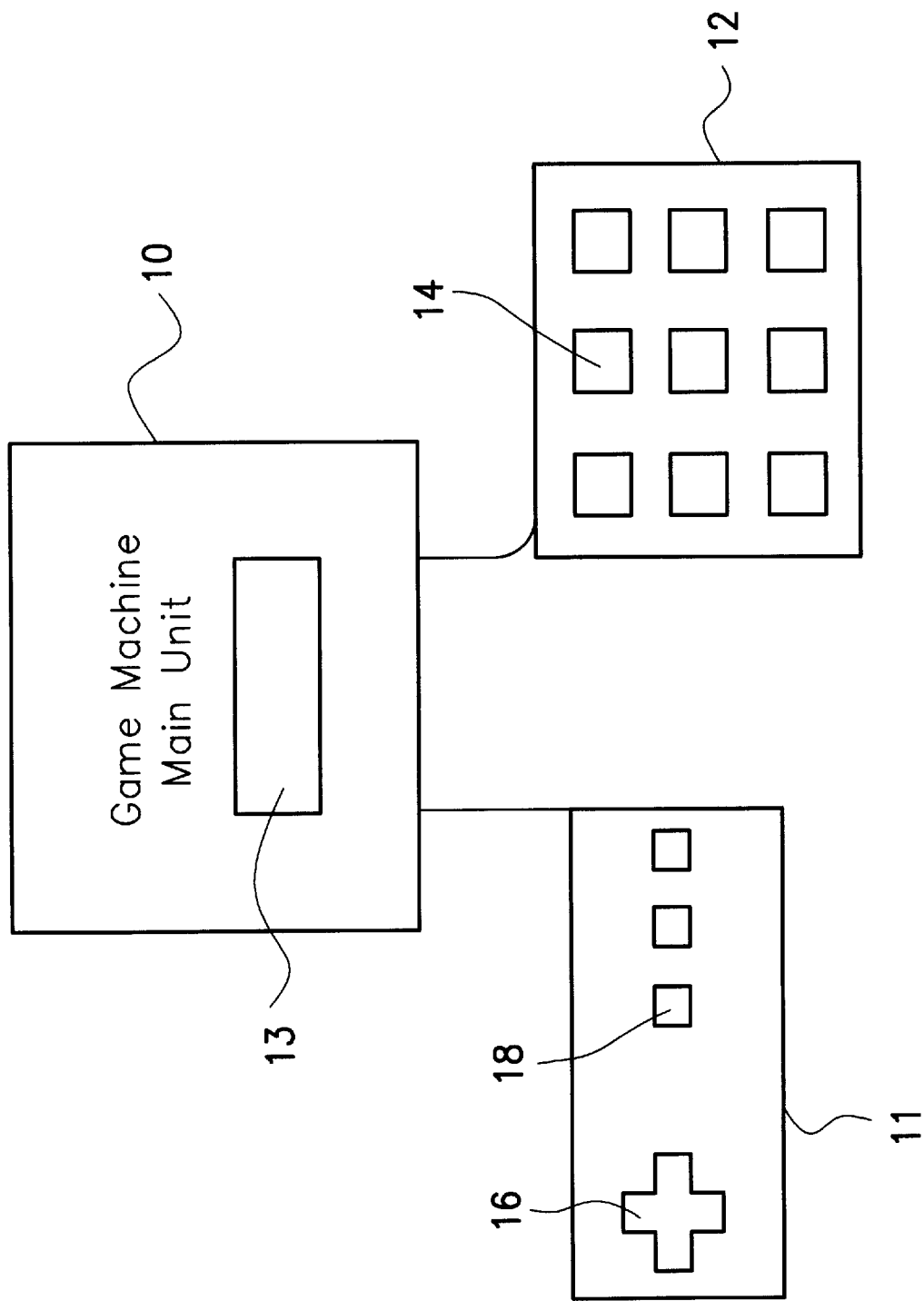
FIG. 1 is a schematic diagram of a first preferred embodiment of a game apparatus of the invention which is provided with a set of fast-access keys on a separate keypad.

FIG. 1 is a schematic diagram of a first preferred embodiment of a game apparatus of the invention which is, for example, a NINTENDO game apparatus. As shown, the game apparatus includes a main unit 10, a game controller 11, and a separate keypad 12. This game apparatus can run game programs from a cassette 13 inserted in the main unit 10. The cassette 13 typically contains several dozens of various kinds of game programs. The keypad 12 includes a number of fast-access keys 14, each key or key combination corresponding to a certain one of the game programs available for play from the cassette 13. For instance, the pressing of the first fast-access key on the keypad 12 allows the player to gain instant access to a first game program; the pressing of the is second fast-access key on the same allows the player to gain instant access to a second game program; and so forth.

In case the number of game programs contained in the cassette 13 is larger than the number of the fast-access keys 14, the extra game programs can be accessed by pressing certain combinations of the fast-access keys 14. The corresponding relationship between the fast-access keys 14 and the game programs is predefined in a fast-access control program which is preloaded in the main unit 10.

After the desired game is running on the game apparatus, the player needs just to use the directional keys 16 or control buttons 18 on the game controller 11 for action control of the game. If the user wishes to play another game, the user needs just to press the corresponding key or key combination on the keypad 12, which allows the player to then gain instant access to another desired one of the game programs from the cassette 13.

It is clear from the foregoing description that the invention provides a fast access means that allows the player to gain access to the desired game program instantly without having to laboriously specify certain settings or options in advance.

Second Preferred Embodiment

Some game control devices, such as flight-simulation controllers or joysticks, are usually provided with an excess number of keys that are nonfunctional dummy keys used only for aesthetic purposes. In such a case, the above-mentioned fast-access keys used in the previous preferred embodiment can be here embodied by replacing these dummy keys with the fast-access keys. No additional keypad is therefore required.

Figure 2:
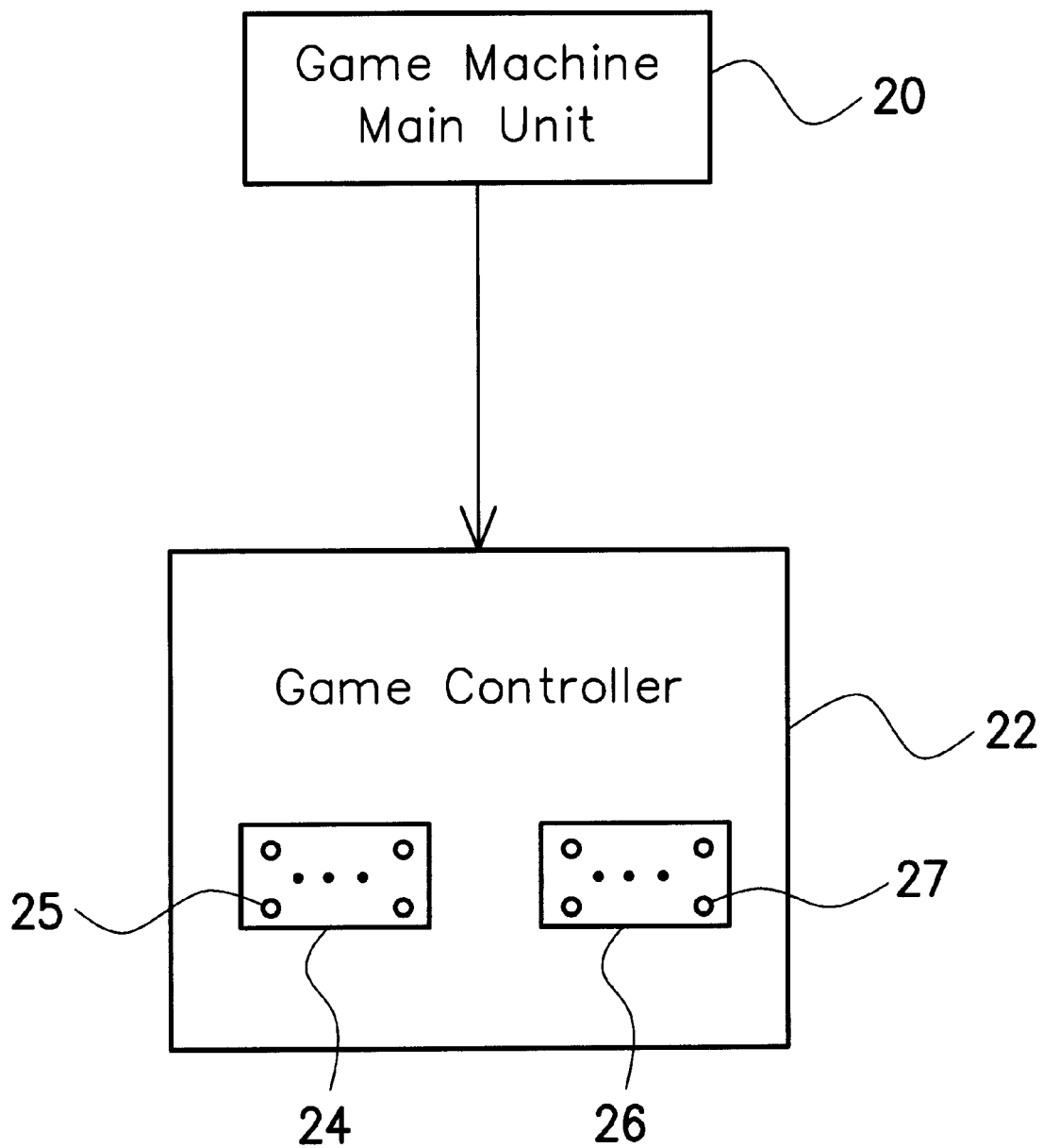
FIG. 2 is a schematic diagram of a second preferred embodiment of a game apparatus of the invention which is provided with a set of fast-access keys integrally along with a set of control keys on a game controller.

FIG. 2 is a schematic diagram of a second preferred embodiment of a game apparatus of the invention. As shown, this game apparatus includes a main unit 20 and a game controller 22 such as a joystick. The game controller 22 includes a fast-access keypad 24 and a control panel 26. The control panel 26 includes a number of control keys 27 which are used for action control of the game currently being running on the game apparatus, if any. The fast-access keypad 24 includes a number of fast-access keys 25, each key or key combination corresponding to a certain one of the game programs available for play from the game apparatus. For instant, the pressing of the first fast-access key on the keypad 24 allows the player to gain instant access to a first game program; the pressing of the second fast-access key on the same allows the player to gain instant access to a second game program; and so forth.

In case the number of game programs available for play on the game apparatus is larger than the number of the fast-access keys 25 on the keypad 24, the extra game programs can be accessed by pressing certain combinations of the fast-access keys 25. The corresponding relationship between the fast-access keys 25 and the game programs is predefined in a fast-access control program which is preloaded in the game controller 22.

After the desired game is running on the game apparatus, the player needs just to use the control keys 27 on the control panel 26 for action control of the game. If the user wishes to play another game, the user needs just to press the corresponding key or key combination on the fast-access keypad 24, which allows the player to then gain instant access to another desired one of the game programs from the game apparatus.

Figure 3:
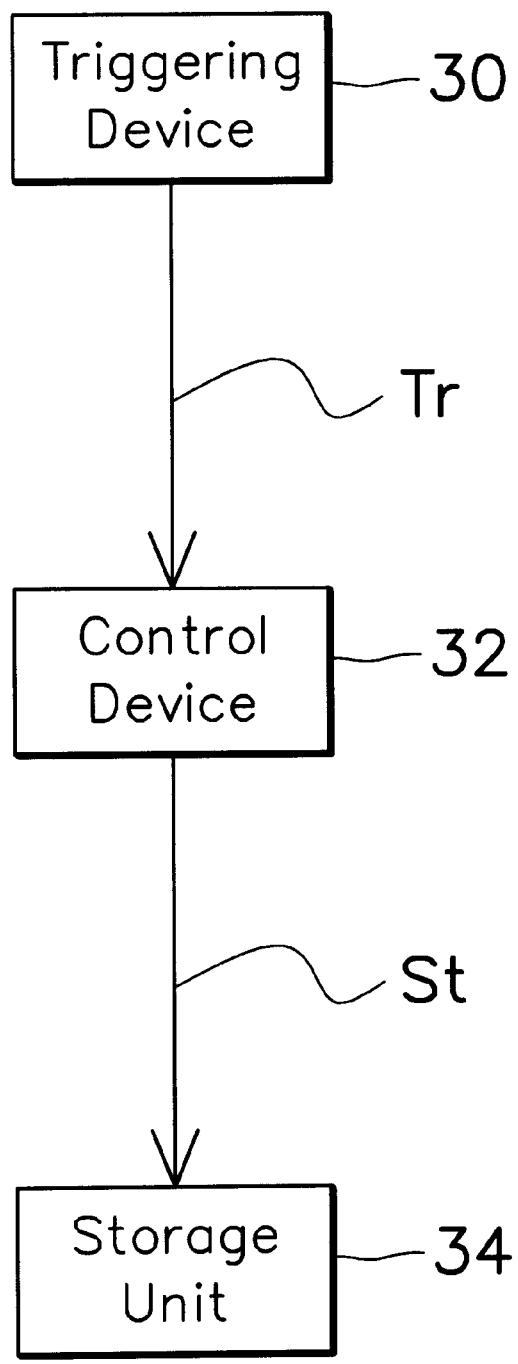
FIG. 3 is a schematic block diagram of the game apparatus with fast-access keys according to the invention.

FIG. 3 is a schematic block diagram of the game apparatus which is provided with the fast-access keys according to the invention. As shown, the game apparatus includes a triggering device 30, a control device 32, and a storage unit 34. The storage unit 34 stores a number of game programs which can be selectively loaded into the main memory (not shown) of the game apparatus in accordance with the player's selection.

The triggering device 30 is associated with the above-mentioned fast-access keys, which can generate and transfers a corresponding trigger signal Tr to the control device 32 when a certain key or key combination of fast-access keys is pressed down by the player. In response to the trigger signal Tr, the control device 32 generates and transfers a corresponding start signal St to the storage unit 34. In response to the start signal St, the selected game program is loaded into the main memory (not shown) of the game apparatus and started running instantly for the player to play with at once.

The invention is not limited to the application on game apparatuses, but can be extended to the realm of PC-running game programs.

Taking the widely used IBM-compatible personal computers (PC) as example, the standard PC keyboard includes more than one hundred keys including alphabetic keys, numeral keys, and function keys. If a player has a number of game programs on a single mass storage medium, such as a floppy disk, a hard disk, or a CD-ROM, the invention can be realized as a fast-access control program which is capable of simulating certain keys on the standard PC keyboard as the above-mentioned fast-access keys which can instantly invoke the corresponding game programs. This fast-access control program can be loaded into the main memory each time the PC is initialized.

In the DOS environment, for example, the command for loading the fast-access control program can be included in the batch file (.BAT) so that it can be immediately loaded into the main memory after the PC is started. In the WINDOWS 95 environment, the action of loading the fast-access control program can also be preset into the operating system so that the fast-access control program is loaded into the main memory of the PC immediately after the operating system is loaded.

The fast-access control program can, for example, use the 0–9 keys on the numerical keypad on the standard PC keyboard to simulate a number of fast-access keys that can be used to instantly start corresponding game software programs stored in a floppy disk, or a hard disks, or a CD-ROM.

For instant, pressing the "1" key on the numerical keypad allows the player to gain instant access to a first game program; pressing "2" on the same allows the player to gain instant access to a second game program; and so forth.

In case the number of game programs contained in the storage medium is larger than the number of the keys on the numerical keypad, the extra game programs can be accessed by pressing certain combinations of the numerical keys. The corresponding relationship between the keys on the numerical keypad and the game programs on the storage medium is predefined in the fast-access control program.

After the desired game is running on the game apparatus, the player needs just to use a game controller, such as a joystick, connected to the PC for action control of the game. If the user wishes to play another game, the user needs just to press the corresponding key or key combination on the numerical keypad, which allows the player to then gain instant access to another desired game program.

Alternatively, the functional keys F1–F12 or any other keys or key combinations on the standard PC keyboard can be instead used as the fast-access keys as long as they are spare to use.

In conclusion, the invention can be utilized on conventional game apparatuses to provide fast-access keys that can help players to gain instant access to selected programs, which allows more friendliness and popularity to the players. Moreover, the invention can be utilized on personal computers to provide a fast-access program that use certain keys on the standard PC keyboard to simulate the above-mentioned fast-access keys that can help PC users to gain instant access to selected programs on the PC.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A game apparatus, comprising:
    a main unit containing a plurality of game programs, each for playing a different one of a plurality of games;
    a keypad coupled to said main unit, said keypad including a number of fast-access keys, each of the keys and of combinations of the keys where the number of game programs exceeds the number of the keys, corresponding to a different one of the game programs, selective actuation of said each of the keys and the combinations of the keys automatically activating, without further actions from a game player, a respective selected one of the game programs; and
    game control means, controllable by the game player and coupled to said main unit, for performing playing actions defined by the selected game program.

2. The game apparatus of claim 1, wherein said main unit includes a fast-access control program which specify the corresponding relationship between said fast-access keys and the game programs, and which is capable of starting the selected game program in response to the corresponding input from said fast-access keys.

3. A game apparatus, comprising:
    a main unit containing a plurality of game programs, each for playing a different one of a plurality of games;
    a game controller coupled to said main unit, said game controller including:
    a fast-access keypad having a number of fast-access keys, each of the keys, and of combinations of the keys where the number of game programs exceeds the number of the keys, corresponding to a different one of the game programs, selective actuation of said each of the keys and the combinations of the keys automatically activating, without further actions from a game player, a respective selected one of the game programs so as to run of the game apparatus; and
    a control panel having a number of control keys used for control of action of the game corresponding to the selected game program running on the game apparatus.

4. The game apparatus of claim 3, wherein said main unit includes a fast-access control program which specify the corresponding relationship between said fast-access keys and the game programs, and which is capable of starting the selected game program in response to the corresponding input from said fast-access keys.

5. The game apparatus of claim 3, wherein said game controller is a joystick.

6. The game apparatus of claim 3, wherein said game controller is a game playing keypad.

7. A game apparatus, comprising:
    a storage unit storing a plurality of game programs;
    a triggering device including a number of fast-access keys, each of the keys, and of combinations of the keys where the number of game programs exceeds the number of the keys, corresponding to a different one of the game programs stored in said storage unit, selective pressing of said each of the keys and the combinations generating a trigger signal corresponding to a selected game program; and
    a control device coupled between said triggering device and said storage unit, and responsive to the trigger signal for generating a start signal for loading and starting the selected game program stored in said storage unit without further actions from a game player to set up the game apparatus.

8. The game apparatus of claim 7, wherein said main unit includes a fast-access control program which specify the corresponding relationship between said fast-access keys and the game programs, and which is capable of starting the selected game program in response to the corresponding input from said fast-access keys.

9. A game apparatus, comprising
    a main unit containing a plurality of game programs;
    a keyboard coupled to said main unit, said keyboard having a plurality of keys;
    means for simulating a selected number of said keys on said keyboard as a number of fast-access keys, each of the fast-access keys, and of combinations of the fast-access keys where the number of game programs exceeds the number of fast-access keys, corresponding to a different one of the game programs, actuation of a selected one of the fast-access keys and combinations of the fast-access keys automatically setting up, without further actions from a game player, a respective selected one of the game programs on the game apparatus.

10. The game apparatus of claim 9, wherein said main unit is a personal computer.

* * * * *